United States Patent Office 2,722,492
Patented Nov. 1, 1955

2,722,492

INSULATED ELECTRICAL CONDUCTOR

Robert H. Ralston, Kennett Square, Pa., assignor to Hercules Powder Company, Wilmington, Del., a corporation of Delaware No Drawing. Application August 17, 1954,
Serial No. 450,535

12 Claims. (Cl. 117—232)

This invention relates to new insulated electrical conductors and, more particularly, to electrical conductors insulated with a coating of a polymer of 3,3-bis(chloromethyl)oxetane, which coatings will remain flexible and nonbrittle even at very low temperatures.

Various materials have been utilized in the past for coating and insulating electrical conductors. Among the more commonly used coatings which may be mentioned are the conventional enamel or oleoresinous varnish-type coatings, natural or synthetic rubbers, polyvinyl resins, polystyrene resins, etc. All of these coating compositions have been found to be lacking in one respect or another. For example, the enamel or varnish coatings lack adequate flexibility. The rubber coatings are not sufficiently resistant to the action of organic solvents with which such wire is frequently in contact, as in refrigeration units, etc. Furthermore, the rubber coatings deteriorate with age and exposure to the atmosphere, resulting in the cracking and peeling of the rubber coating. The polyvinyl and polystyrene resin coatings are subject to attack by organic solvents and lack a sufficient degree of flexibility and nonbrittleness at low temperature. Hence these materials are not completely satisfactory for electrical insulation.

Now, in accordance with this invention, it has been found that insulated electrical conductors having excellent dielectric properties may be prepared by coating the electrical conductor with a plasticized polymer of 3,3-bischloromethyl)oxetane. These insulated electrical conductors will remain flexible at low temperatures and have a high degree of shock resistance at both low and normal temperatures. One of the outstanding properties of the use of such coatings for electrical conductors is that the coating is not attacked by most organic solvents including gasoline and grease, nor is it attacked by most acids, water, etc. Hence, wire insulated in accordance with this invention may be used in many applications where other insulated electrical conductors cannot be used.

The insulated electrical conductors in accordance with this invention are prepared by admixing a plasticizer with a polymer of 3,3-bis(chloromethyl)oxetane and then coating the conductor with this mixture. Any high molecular weight polymer of 3,3-bis(chloromethyl)oxetane may be used in the preparation of the insulating material. These polymers may be a homopolymer of 3,3-bis(chloromethyl)oxetane or a copolymer thereof, as, for example, a copolymer with other 3,3-disubstituted oxetanes such as 3,3-bis(fluoromethyl)oxetane, 3,3-bis-(bromomethyl)oxetane, 3-chloromethyl-3-methyloxetane, 3,3-dimethyloxetane, etc., or any other copolymerizable monomer such as oxetane, etc. In general, the polymers that are used for preparing the insulation in accordance with this invention will be those that have a molecular weight of about 25,000 or a specific viscosity of at least about 0.3, when measured as a 1% solution in cyclohexanone at 50° C. Preferably, the polymer will have a specific viscosity of at least about 0.5, and more preferably of at least about 0.8, when measured as a 1% solution in cyclohexanone at 50° C.

These polymers of 3,3-bis(chloromethyl)oxetane may be prepared by contacting 3,3-bis(chloromethyl)oxetane, or a mixture thereof with a copolymerizable monomer, with boron trifluoride or its molecular complexes. The polymerization reaction may be carried out in the presence of an inert organic liquid diluent. Any inert organic solvent may be used as the diluent for the polymerization. However, highly polar organic solvents such as dioxane, etc., are preferably not used since they retard the polymerization by inactivating the catalyst. The polymerization may also be carried out in an inert inorganic solvent such as liquid sulfur dioxide. The solvent should, of course, not be one which will cause chain termination since such a solvent, as, for example, an alcohol, would not then be inert. Exemplary of the organic solvents which may be used for carrying out the polymerization of 3,3-bis(chloromethyl)oxetane or copolymerization thereof are the hydrocarbon solvents such as n-hexane, cyclohexane, benzene, toluene, etc., chlorinated solvents such as methylene chloride, chloroform, carbon tetrachloride, dichlorobenzene, etc., and nitroalkanes such as nitromethane, etc. The catalyst may be added directly to the monomer solution in inert diluent or it may be added as a solution, if desired. The amount of catalyst which is added to the monomer may vary over a wide range but usually from about 0.1% to about 10% is adequate and preferably an amount of from about 0.6% to about 4%, based on the monomer, will be used. The amount of catalyst will, of course, vary with the type of polymerization reaction.

The temperature at which the polymerization or copolymerization of 3,3-bis(chloromethyl)oxetane is carried out may vary over a wide range. In general, the molecular weight of the polymer produced increases with a decrease in temperature. Hence, for the production of higher molecular weight polymers, the temperature should be held below about 80° C. In general, the polymerization reaction will be carried out, by selection of appropriate solvent, etc., at a temperature within the range of from about —80° C. to about 80° C., preferably at a temperature below about 30° C. and more preferably at a temperature below about 20° C. Although the reaction mixture may turn solid very quickly, higher conversions may be obtained by allowing it to "cure" for several hours, the polymerization continuing in what is apparently a solid phase. The polymerization reaction may, of course, be performed in a batchwise manner or as a continuous reaction.

The manner in which the polymer is isolated will depend upon the type of polymerization system used. For example, if a large amount of solvent was used as a diluent, the polymer may be separated simply by filtration. Otherwise, it is readily isolated by treating the reaction mixture with a liquid in which the polymer is insoluble but which will destroy the catalyst which was used for the polymerization reaction. Alcohols such as methanol, ethanol, isopropanol, etc., are suitable for this purpose. The polymer then may be separated by filtration.

The following examples will illustrate the preparation of the polymers of 3,3-bis(chloromethyl)oxetane which are used for the insulation of electrical conductors in accordance with this invention. All parts and percentages are by weight unless otherwise indicated.

*Example 1*

A solution of 1 part of 3,3-bis(chloromethyl)oxetane in 2 parts of chloroform was cooled to —35° C. and held at that temperature while a slow stream of nitrogen was passed through it, boron trifluoride being bled into the nitrogen stream at such a rate that the temperature elevation was maintained within one to two degrees. Within ½ hour the reaction mixture had become so viscous that it could no longer be stirred. It was then allowed to stand at −35° C. for 2 hours, after which the polymer was recovered by agitating the reaction mixture with methanol and filtering. The polymer was washed with methanol and dried in vacuo at 60° C. The white solid product so obtained had a softening point of 165–170° C. The specific viscosity of a 1% solution of it in cyclohexanone was 0.702 which corresponds to a molecular weight of about 42,000.

*Example 2*

The above example was repeated except that methylene chloride was used in place of chloroform and the temperature was held at −50° C. throughout the polymerization. The polymer so obtained had a softening point of about 165–170° C. and an intrinsic viscosity of 1.05 which is equivalent to a molecular weight of about 60,000 to 100,00.

*Example 3*

A solution of 1 part of 3,3-bis(chloromethyl)oxetane in 2 parts of methylene chloride was cooled to −50° C. and held at that temperature while a slow stream of nitrogen was passed through it, boron trifluoride being bled into the nitrogen stream at such a rate as to maintain the temperature within one or two degrees. The total amount of boron trifluoride used was 0.7% based on the weight of the monomer. At the end of 4 hours, the polymer was isolated as described in the above examples. The specific viscosity of a 1% solution of this polymer in cyclohexanone at 50° C. was 1.6.

*Example 4*

A solution of 1 part of a freshly distilled 3,3-bis(chloromethyl)oxetane in 2 parts of methylene chloride was cooled to about −45° C. Boron trifluoride was bled into this solution as described in the foregoing examples until an amount of about 2.0% of boron trifluoride based on the weight of the monomer had been added. After 1½ hours the polymer was isolated. The conversion of monomer to polymer amounted to 74%. A 1% solution of this polymer in cyclohexanone at 50° C. had a specific viscosity of 2.3.

*Example 5*

A solution of 1 part of a carefully purified 3,3-bis(chloromethyl)oxetane in 2 parts of methylene chloride was cooled to −50° C. Boron trifluoride (1.0% based on the weight of the monomer) was then added as in the foregoing examples. After 1 hour the polymer was isolated. The specific viscosity of this polymer (1% solution in cyclohexanone at 50° C.) was 3.7.

*Example 6*

A slow stream of nitrogen was passed into an agitated solution of 117 parts of 3,3-bis(chloromethyl)oxetane and 12 parts of 3-chloromethyl-3-methyloxetane. After cooling to −30° C., 3.88 parts of gaseous boron trifluoride was introduced into the nitrogen stream. Polymerization was then allowed to proceed at that temperature for 4 hours, after which 300 parts of methanol was added. The polymer was removed by filtration, washed with methanol, and dried. It was a powder having a melting point of 152°–156° C. and a specific viscosity of 1.217 when measured as a 1% solution in cyclohexanone. It contained 43.6% chlorine.

*Example 7*

A slow stream of nitrogen was passed into a solution of 7.3 parts of dimethyloxetane and 95 parts of 3,3-bis(chloromethyl)oxetane in 210 parts of liquid sulfur dioxide and cooled to −30° C. Gaseous boron trifluoride, 3 parts, was then added and the polymerization was allowed to proceed at that temperature for 5 hours. Methanol, 300 parts, was then added and the polymer was separated by filtration, washed with methanol, and dried. It was a powder having a melting point of 159°–163° C. and a specific viscosity of 0.999 when measured as a 1% solution in cyclohexanone. It contained 42.0% chlorine.

In accordance with this invention any polymer of 3,3-bis(chloromethyl)oxetane having a specific viscosity, when measured as a 1% solution in cyclohexanone at 50° C., of at least about 0.3, preferably at least about 0.5 and more preferably of at least about 0.8, may be used for the preparation of the insulation for electrical conductors when admixed with a suitable plasticizer. As already pointed out above, these plasticized 3,3-bis-(chloromethyl)oxetane polymer coatings will remain flexible at low temperatures and have a very high degree of shock resistance. Any plasticizer compatible with the polymer may be used in the preparation of this insulation, as, for example, esters of carboxylic acids, and preferably diesters, i. e., esters of dicarboxylic acids are esters of polyhydric alcohols, phosphate esters, hydrocarbon oils, halogenated hydrocarbon oils, etc., and various polymeric materials such as polyethers, polyesters, etc. In view of the nonsolvent action of plasticizers on polymeric 3,3-bis(chloromethyl)oxetane even at temperatures as high as 100° C., it was most surprising to discover that they could be incorporated in the polymer and exhibit a plasticizing effect. Exemplary of the plasticizers that may be used are esters of carboxylic acids such as the alkyl stearates, oleates, palmitates, sebacates, adipates, phthalates, etc., as, for example, amyl stearate, butyl oleate, dioctyl sebacate, dibutyl sebacate, di-2-ethylhexyl adipate, di-2-ethylhexyl phthalate, n-octyl decyl phthalate, glycerol triacetate, glycerol tripropionate, pentaerythritol diacetate dibutyrate, dipentaerythritol diacetate dipropionate dibutyrate, and the pentaerythritol tetraester of mixed $C_4$ to $C_9$ acids, polyesters such as the polyester of sebacic acid and ethylene glycol, phosphates such as tricresyl phosphate, cresyl diphenyl phosphate, 2-ethylhexyl diphenyl phosphate, fluorinated chlorinated hydrocarbon oils, hydrocarbon oils such as mineral oil, chlorinated diphenyl, α-chloronaphthalene, the solid polyethylene glycols sold under the trade name, Carbowax, and other polymeric materials such as styrene-acrylonitrile copolymers, polydimethyloxetane (polymerized 3,3-dimethyloxetane), polymerized 3-chloromethyl-3-methyloxetane, etc.

The plasticizers may be incorporated into the polymer by any of the usual methods, as, for example, dry-blending either alone or followed by extrusion, solvent colloiding, or slurrying, etc. The amount of the plasticizer used in the inclulation for electrical conductors in accordance with this invention will vary, depending on the plasticizer being used, but in general, will be an amount of from about 3% to about 30% of the total weight of the insulating composition and preferably will be an amount of from about 5% to about 20%. For some wire applications, it may be desirable to use higher amounts of plasticizer, up to about 50%, but this is not usually desirable.

In order to avoid degradation of the polymer which may occur during the coating of the electrical conductor, particularly in extrusion coating methods where the polymer may be held at high temperatures in the presence of air for long periods of time, it is frequently desirable to incorporate a stabilizer. If the electrical conductor is to be used in applications where it is exposed to ultraviolet light for long periods of time, it will also be desirable to add a stabilizer. Any phenolic stabilizer or ester or ether thereof may be used to bring about such stabilization. Some of these phenolic compounds or esters or ethers thereof are more effective as heat stabilizers while others are more effective as light stabilizers although in many instances the compound will act as both. It may, therefore, be desirable to use more than one of the phenolic stabilizers. While any phenol will exert some stabilization, the phenol will preferably contain at least one alkyl substituent having at least 4 carbon atoms, or aryl substituent, or aralkyl substituent. Exemplary of the highly substituted phenols, esters of phenols, and ethers of phenols that may be used as heat and/or light stabilizers for the polymers of 3,3-bis(chloromethyl)oxetane are di-tert-butyl-p-cresol, o,p-diamylphenol, o- and p-tert-amylphenol, p-octylphenol, benzoyl resorcinol (i. e., 2,4-dihydroxybenzophenone), p-cyclohexylphenol and the similarly substituted naphthols, 2,2-methylenebis(4-methyl-6-tert-butylphenol), 2,6-bis[(2-hydroxy-5-methylphenol)methyl]-p-cresol, p,p'-isopropylidenebisphenol, p,p' - sec - butylidenebisphenol, 4,4'-isopropylidene-bis-o-cresol, resorcinol monobenzoate, hydroquinone monobenzoate, propyl gallate, the monobenzyl ether of hydroquinone, and the epoxy resins produced by the reaction of epichlorohydrin with various bisphenols such as p,p'-isopropylidenebisphenol, p,p'-sec-butylidenebisphenol, 4,4'-isopropylidene-bis-o-cresol, etc. The amount of such phenolic stabilizer that is incorporated in the polymer prior to coating the electrical insulator may be varied over a wide range but, in general, will be an amount of from about 0.1% to about 5% by weight of the polymer. More may be used but generally is not necessary.

For many applications of the insulated electrical conductors of this invention, it may be desirable to incorporate other additives in the coating composition, as, for example, fillers, pigments, etc. The fillers, pigments, etc., that may be incorporated should be selected from those whose electrical properties are such as will not impair the electrical properties of the insulated conductor. The amount of such additives included in the coating composition will, of course, depend upon the type of electrical conductor being insulated, etc. Obviously many other modifications may be made of the coating compositions of this invention used for insulating electrical conductors.

The coating of the 3,3-bis(chloromethyl)oxetane polymer on the electrical conductor to produce the insulated conductors of this invention may be applied by any of the well-known methods of applying coatings to electrical conductors. In general, wire may be insulated by extruding the polymeric coating composition around the wire in any of the well-known types of machines suitable for this purpose. In such extrusion operations, the wire to be coated is fed through a heated die and the heated 3,3-bis(chloromethyl)oxetane polymer, or mixtures of polymer containing such additives as may be desirable, is caused to flow through the die and around the wire. The tubing technique of extrusion coating may also be used. The wire so coated is then quenched in either cold or warm water, air, etc., whereby the coating is affixed to the wire and no further operations are required to make the 3,3-bis(chloromethyl)oxetane polymer coating adhere to the wire. Thus the insulation coatings of this invention do not require the baking, annealing, etc., operations required by many coating compositions. Alternatively, wire may be coated by dipping or spraying the wire with a solution of the polymer, as, for example, in cyclohexanone, isophorone, dioxane, etc., followed by evaporation of the solvent. Obviously such a process is not as advantageous for coating wire as the extrusion coating method mentioned above. However, for some electrical conductors, it may be more desirable, as, for example, where very thin wire coatings are desired.

The following examples will illustrate the preparation of electrical conductors insulated with the plasticized 3,3-bis(chloromethyl)oxetane polymer insulating compositions of this invention.

*Example 8*

Ninety-five parts of finely divided 3,3-bis(chloromethyl)oxetane having a specific viscosity of 1.30, when measured as a 1% solution in cyclohexanone at 50° C., and containing 0.5% of 2,2-methylenebis(4-methyl-6-tert-butylphenol) was mixed with an acetone solution containing 5 parts of dibutyl sebacate and thoroughly agitated to ensure uniform mixture. The acetone solvent was then removed and the product was vacuum-dried at 60–70° C. for 4 hours. This composition was then coated on No. 20 gauge copper wire using a 1-inch screw-type extruder with a crosshead wire coating die. The screw was operated at 27.2 R. P. M. and the cylinder temperature of the extruder was 204° C. The wire was fed through the die at 1.08 ft./sec. and then through a water bath at 24° C. for a distance of 8 inches, after which it went to a belt carrier. A smooth, transparent, adherent coating of 10 mils thickness was placed on the wire by this procedure. The coating on this wire did not crack when the wire was wound on a 1/16 inch mandrel at 0° C., had a cut-through temperature above 165° C., and a heat deformation temperature above 150° C.

*Example 9*

Wire was coated as in Example 8 except that the coating mixture contained 20% of dibutyl sebacate instead of the 5% in that example. The wire so coated did not crack in a 1/4 inch mandrel test at −40° C. It had a cut-through temperature of 135° C. and the heat deformation temperature was above 160° C.

*Examples 10–13*

In each of these examples, Example 8 was repeated except that the dibutyl sebacate used in that example was replaced with tricresyl phosphate, di-2-ethylhexyl phthalate, n-octyl decyl phthalate, and a refined mineral oil, respectively. In the extrusion of each of these compositions on the wire, the cylinder temperature was 193° C. and the wire was fed at a rate of 1.71 ft./min. The coated wire obtained in each of these examples did not crack at 0° C. when wound on a 1/16 inch mandrel.

*Example 14*

Wire was coated as in Example 8 except that the coating composition contained 20% of tricresyl phosphate instead of the 5% dibutyl sebacate used in that example and the cylinder temperature of the extruder was 188° C. and the wire traveled at 1.93 ft./min. The wire so coated did not crack on a 1/16 inch mandrel at −10° C.

What I claim and desire to protect by Letters Patent is:

1. An insulated electrical conductor comprising an electrical conductor and as insulation therefor a polymer of the group consisting of homopolymers of 3,3-bis(chloromethyl)oxetane, copolymers of 3,3-bis(chloromethyl)oxetane with other 3,3-disubstituted oxetanes, and copolymers of 3,3-bis(chloromethyl)oxetane with oxetane admixed with a nonsolvent plasticizer therefor, said plasticizer being present in an amount of at least about 3% of the total mixture and said polymer having a specific viscosity of at least about 0.3, when measured as a 1% solution in cyclohexanone at 50° C.

2. An insulated electrical conductor comprising an electrical conductor and as insulation therefore a polymer of the group consisting of homopolymers of 3,3-bis(chloromethyl)oxetane, copolymers of 3,3-bis(chloromethyl)oxetane with other 3,3-disubstituted oxetanes, and copolymers of 3,3-bis(chloromethyl)oxetane with oxetane admixed with a nonsolvent plasticizer and a stabilizer for the polymer, said plasticizer being present in an amount of from about 3% to about 30% of the total mixture and said polymer having a specific viscosity of at least about 0.3, when measured as a 1% solution in cyclohexanone at 50° C.

3. An insulated electrical conductor comprising an electrical conductor and as insulation therefor a homopolymer of the group consisting of homopolymers of 3,3-bis(chloromethyl)oxetane, copolymers of 3,3-bis(chloromethyl)oxetane with other 3,3-disubstituted oxetanes, and copolymers of 3,3-bis(chloromethyl)oxetane with oxetane admixed with a stabilizer therefor and with a diester of a dicarboxylic acid, said ester being present in an amount of from about 3% to about 30% of the total mixture and said polymer having a specific viscosity of at least about 0.3, when measured as a 1% solution in cyclohexanone at 50° C.

4. An insulated electrical conductor comprising an electrical conductor and as insulation therefor a homopolymer of 3,3-bis(chloromethyl)oxetane admixed with a stabilizer therefor and with a phosphate ester, said phosphate being present in an amount of from about 3% to about 30% of the total mixture and said polymer having a specific viscosity of at least about 0.3, when measured as a 1% solution in cyclohexanone at 50° C.

5. An insulated electrical conductor comprising an electrical conductor and as insulation therefor a homopolymer of 3,3-bis(chloromethyl)oxetane admixed with a stabilizer therefor and with a dialkyl sebacate, said sebacate being present in an amount of from about 3% to about 30% of the total mixture and said polymer having a specific viscosity of at least about 0.3, when measured as a 1% solution in cyclohexanone at 50° C.

6. An insulated electrical conductor comprising an electrical conductor and as insulation therefor a homopolymer of 3,3-bis(chloromethyl)oxetane admixed with a stabilizer therefor and with a dialkyl phthalate, said phthalate being present in an amount of from about 3% to about 30% of the total mixture and said polymer having a specific viscosity of at least about 0.3, when measured as a 1% solution in cyclohexanone at 50° C.

7. An insulated electrical conductor comprising an electrical conductor and as insulation therefor a homopolymer of 3,3-bis(chloromethyl)oxetane admixed with a stabilizer therefor and a dialkyl sebacate, said sebacate being present in an amount of from about 5% to about 20% of the total mixture and said polymer having a specific viscosity of at least about 0.3, when measured as a 1% solution in cyclohexanone at 50° C.

8. An insulated electrical conductor comprising an electrical conductor and as insulation therefor a homopolymer of 3,3-bis(chloromethyl)oxetane admixed with a stabilizer therefor and a dialkyl phthalate, said phthalate being present in an amount of from about 5% to about 20% of the total mixture and said polymer having a specific viscosity of at least about 0.3, when measured as a 1% solution in cyclohexanone at 50° C.

9. An insulated electrical conductor comprising an electrical conductor and as insulation therefor a homopolymer of 3,3-bis(chloromethyl)oxetane admixed with a stabilizer therefor and with a phosphate ester, said phosphate being present in an amount of from about 5% to about 20% of the total mixture and said polymer having a specific viscosity of at least about 0.3, when measured as a 1% solution in cyclohexanone at 50° C.

10. A wire having as a coating thereon a coating composition comprising a polymer of the group consisting of homopolymers of 3,3-bis(chloromethyl)oxetane, copolymers of 3,3-bis(chloromethyl)oxetane with other 3,3-disubstituted oxetanes, and copolymers of 3,3-bis(chloromethyl)oxetane with oxetane and a nonsolvent plasticizer, said nonsolvent plasticizer being present in the coating in an amount of at least about 3% and said polymer having a specific viscosity of at least about 0.3, when measured as a 1% solution in cyclohexanone at 50° C.

11. A wire having as a coating thereon a coating composition comprising a polymer of the group consisting of homopolymers of 3,3-bis(chloromethyl)oxetane, copolymers of 3,3-bis(chloromethyl)oxetane with other 3,3-disubstituted oxetanes, and copolymers of 3,3-bis(chloromethyl)oxetane with oxetane a stabilizer and a nonsolvent plasticizer therefor, said nonsolvent plasticizer being present in the coating in an amount of from about 3% to about 30% and said polymer having a specific viscosity of at least about 0.3, when measured as a 1% solution in cyclohexanone at 50° C.

12. A wire having as a coating thereon a coating composition comprising a polymer of the group consisting of homopolymers of 3,3-bis(chloromethyl)oxetane, copolymers of 3,3-bis(chloromethyl)oxetane with other 3,3-disubstituted oxetanes, and copolymers of 3,3-bis(chloromethyl)oxetane with oxetane, a stabilizer and a nonsolvent plasticizer therefor, said nonsolvent plasticizer being present in the coating in an amount of from about 5% to about 20% and said polymer having a specific viscosity of at least about 0.3, when measured as a 1% solution in cyclohexanone at 50° C.

References Cited in the file of this patent

UNITED STATES PATENTS

| | | |
|---|---|---|
| 2,455,912 | Cairns et al. | Dec. 14, 1948 |
| 2,462,048 | Wyler | Feb. 15, 1949 |
| 2,660,563 | Banes et al. | Nov. 24, 1953 |
| 2,684,353 | Greenspan et al. | July 24, 1954 |